US010209943B2

(12) United States Patent
Ouchi

(10) Patent No.: US 10,209,943 B2
(45) Date of Patent: Feb. 19, 2019

(54) DISPLAY CONTROL APPARATUS, CONTROL METHOD THEREOF AND STORAGE MEDIUM

(71) Applicant: CANON KABUSHIKI KAISHA, Tokyo (JP)

(72) Inventor: Akihiro Ouchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/955,392

(22) Filed: Dec. 1, 2015

(65) Prior Publication Data
US 2016/0162246 A1 Jun. 9, 2016

(30) Foreign Application Priority Data

Dec. 4, 2014 (JP) ................. 2014-246099

(51) Int. Cl.
G06F 3/14 (2006.01)
G09G 3/00 (2006.01)
(Continued)

(52) U.S. Cl.
CPC .......... *G06F 3/1446* (2013.01); *G06F 3/1431* (2013.01); *G06T 11/60* (2013.01);
(Continued)

(58) Field of Classification Search
CPC ..... G06F 3/1446; G06F 3/1431; G09G 3/002; G09G 2340/04
See application file for complete search history.

(56) References Cited

U.S. PATENT DOCUMENTS 5,136,390 A * 8/1992 Inova ................. H04N 5/57
348/383
5,734,446 A * 3/1998 Tokoro ................ H04N 9/31
348/383
(Continued)

FOREIGN PATENT DOCUMENTS

CN 102318350 A 1/2012
CN 103248850 A 8/2013
(Continued)

OTHER PUBLICATIONS

European search report issued in corresponding application No. 15003357.9 dated Apr. 4, 2016.
(Continued)

*Primary Examiner* — Nitin Patel
*Assistant Examiner* — Robert M Stone
(74) *Attorney, Agent, or Firm* — Carter, DeLuca, Farrell & Schmidt, LLP

(57) ABSTRACT

A display control apparatus causes a plurality of images to be arranged and projected by a plurality of projection units. An obtaining unit obtains an overlap value for indicating a width at which a portion of a first image and a portion of a second image overlap. A control unit causes the plurality of projection units to project the plurality of images which includes at least the first image and the second image by overlapping the portion of the first image and the portion of the second image by a width based on the overlap value. Also, the control unit causes the portion of the first image and the portion of the second image to overlap by the width based on the overlap value by changing a size of a projected image.

14 Claims, 3 Drawing Sheets

(51) Int. Cl.
*G06T 11/60* (2006.01)
*H04N 9/31* (2006.01)

(52) U.S. Cl.
CPC ............... *G09G 3/002* (2013.01); *H04N 9/31* (2013.01); *G09G 2300/026* (2013.01); *G09G 2340/04* (2013.01); *G09G 2340/12* (2013.01)

(56) References Cited

U.S. PATENT DOCUMENTS

| | | | | |
|---|---|---|---|---|
| 6,005,987 | A * | 12/1999 | Nakamura | G06T 3/4038 348/42 |
| 6,205,259 | B1 * | 3/2001 | Komiya | G06T 5/50 348/E3.032 |
| 6,219,011 | B1 * | 4/2001 | Aloni | G06F 3/147 345/1.3 |
| 6,222,593 | B1 * | 4/2001 | Higurashi | G03B 37/04 315/368.12 |
| 6,377,306 | B1 * | 4/2002 | Johnson | H04N 9/12 348/383 |
| 6,393,162 | B1 * | 5/2002 | Higurashi | G06T 5/006 345/629 |
| 6,456,339 | B1 * | 9/2002 | Surati | G03B 37/04 348/744 |
| 6,480,175 | B1 * | 11/2002 | Schneider | G06F 3/1446 345/32 |
| 6,561,651 | B1 * | 5/2003 | Kubota | G03B 21/28 348/E9.012 |
| 6,695,451 | B1 * | 2/2004 | Yamasaki | H04N 9/12 348/E5.144 |
| 6,814,448 | B2 * | 11/2004 | Ioka | G03B 21/005 348/745 |
| 2002/0024640 | A1 | 2/2002 | Ioka | G03B 21/13 353/94 |
| 2003/0227599 | A1 * | 12/2003 | Weissman | H04N 5/74 353/94 |
| 2005/0117126 | A1 * | 6/2005 | Miyazawa | H04N 9/3194 353/94 |
| 2005/0146644 | A1 * | 7/2005 | Miyazawa | H04N 5/74 348/745 |
| 2005/0206857 | A1 * | 9/2005 | Yamada | G03B 21/56 353/94 |
| 2005/0287449 | A1 * | 12/2005 | Matthys | G03B 21/13 430/30 |
| 2006/0290890 | A1 * | 12/2006 | Saito | G03B 21/14 353/30 |
| 2008/0018740 | A1 * | 1/2008 | Iyoda | H04N 5/23232 348/148 |
| 2008/0036971 | A1 * | 2/2008 | Hasegawa | G03B 21/26 353/30 |
| 2008/0143978 | A1 * | 6/2008 | Damera-Venkata | G09G 3/002 353/94 |
| 2009/0066723 | A1 * | 3/2009 | Saito | H04N 9/3147 345/629 |
| 2010/0201702 | A1 | 8/2010 | Franik et al. | |
| 2011/0019108 | A1 * | 1/2011 | Nelson | H04N 9/31 348/745 |
| 2011/0210987 | A1 * | 9/2011 | Furui | H04N 9/31 345/682 |
| 2011/0211064 | A1 * | 9/2011 | Furui | H04N 9/31 348/135 |
| 2012/0032978 | A1 * | 2/2012 | Chae | H04N 9/3147 345/644 |
| 2012/0099081 | A1 * | 4/2012 | Huang | G03B 21/005 353/30 |
| 2014/0211168 | A1 * | 7/2014 | Yano | G06F 3/1431 353/30 |
| 2015/0237317 | A1 * | 8/2015 | Ehara | H04N 9/3185 348/745 |
| 2016/0139869 | A1 * | 5/2016 | Ito | G06F 3/1446 345/1.3 |

FOREIGN PATENT DOCUMENTS

| | | |
|---|---|---|
| CN | 103369283 A | 10/2013 |
| CN | 103929604 A | 7/2014 |
| EP | 1039749 A1 | 9/2000 |
| JP | 2006-014356 A | 1/2006 |
| JP | 2012154984 A | 8/2012 |

OTHER PUBLICATIONS

Chinese Office Action issued in corresponding application No. 201510844336.0 dated Mar. 3, 2017.
Japanese Office Action dated Sep. 18, 2018 in corresponding Japanese Patent Application No. 2014-246099, with English translation.

* cited by examiner

DISPLAY CONTROL APPARATUS, CONTROL METHOD THEREOF AND STORAGE MEDIUM

BACKGROUND OF THE INVENTION

Field of the Invention

The present invention relates to a display control apparatus, a control method thereof and a storage medium, and in particular relates to a technique for generating a multi-screen using a plurality of projection apparatuses.

Description of the Related Art

Conventionally, techniques for configuring a projected image in which a plurality of projected images that are projected from a plurality of a projection apparatuses are combined (hereinafter referred to as a multi-screen) are known.

When configuring a multi-screen, image areas in which respective adjacent projected images overlap are arranged, and joint lines is made to not be noticeable by performing a luminance correction on image signals of such overlap areas. In a case where such a multi-screen is configured, it is necessary to adjust so that the plurality of images that are projected from the plurality of projection apparatuses are displayed at appropriate positions.

In this respect, a technique is disclosed in Japanese Patent Laid-Open No. 2006-14356 in which pattern images projected from a plurality of projection apparatuses are captured by a camera, a projection distortion correction parameter is generated, and in addition to correcting the shape of the projection on the screen, the overlap areas of the image are calculated and a luminance correction is performed.

In Japanese Patent Laid-Open No. 2006-14356, an image displayed on a multi-screen is generated by dividing high definition image data based on information of the overlap areas and the projection distortion correction parameter generated by adjustment. Conversely, because the entire angle of view changes when the overlap area changes as a result of the adjustment, the image that is projected on the multi-screen is changed.

However, when multi-screens of the same specifications are constructed at many locations, an image that is divided so as to provide a pre-determined overlap area is prepared as a image that is displayed on the multi-screen, for example, but with the technique of Japanese Patent Laid-Open No. 2006-14356, because the overlap areas of the image are not defined, there are cases in which the image prepared in advance and the image that is projected do not match.

SUMMARY OF THE INVENTION

The present invention has been made in consideration of the above problems, and provides a technique of aligning an image that is prepared with an image that is projected.

According to one aspect of the present invention, there is provided a display control apparatus for causing a plurality of images to be arranged and projected by a plurality of projection units comprises: an obtaining unit for obtaining an overlap value for indicating a width at which a portion of a first image and a portion of a second image overlap; and a control unit for causing the plurality of projection units to project the plurality of images which includes at least the first image and the second image by overlapping the portion of the first image and the portion of the second image by a width based on the overlap value, wherein the control unit causes the portion of the first image and the portion of the second image to overlap by the width based on the overlap value by changing a size of a projected image.

According to one aspect of the present invention, there is provided a method of controlling a display control apparatus for causing a plurality of images to be arranged and projected by a plurality of projection units, the method comprising: obtaining an overlap value for indicating a width at which a portion of a first image and a portion of a second image overlap; and controlling to cause the plurality of projection units to project the plurality of images which includes at least the first image and the second image by overlapping the portion of the first image and the portion of the second image by a width based on the overlap value, wherein in the controlling, the portion of the first image and the portion of the second image is caused to overlap by the width based on the overlap value by changing a size of a projected image.

Further features of the present invention will become apparent from the following description of exemplary embodiments (with reference to the attached drawings).

DESCRIPTION OF THE EMBODIMENTS

Hereinafter, an explanation of the embodiment of the present invention is given with reference to attached figures.

<1. Overview Configuration of Image Display System>

Figure 1:
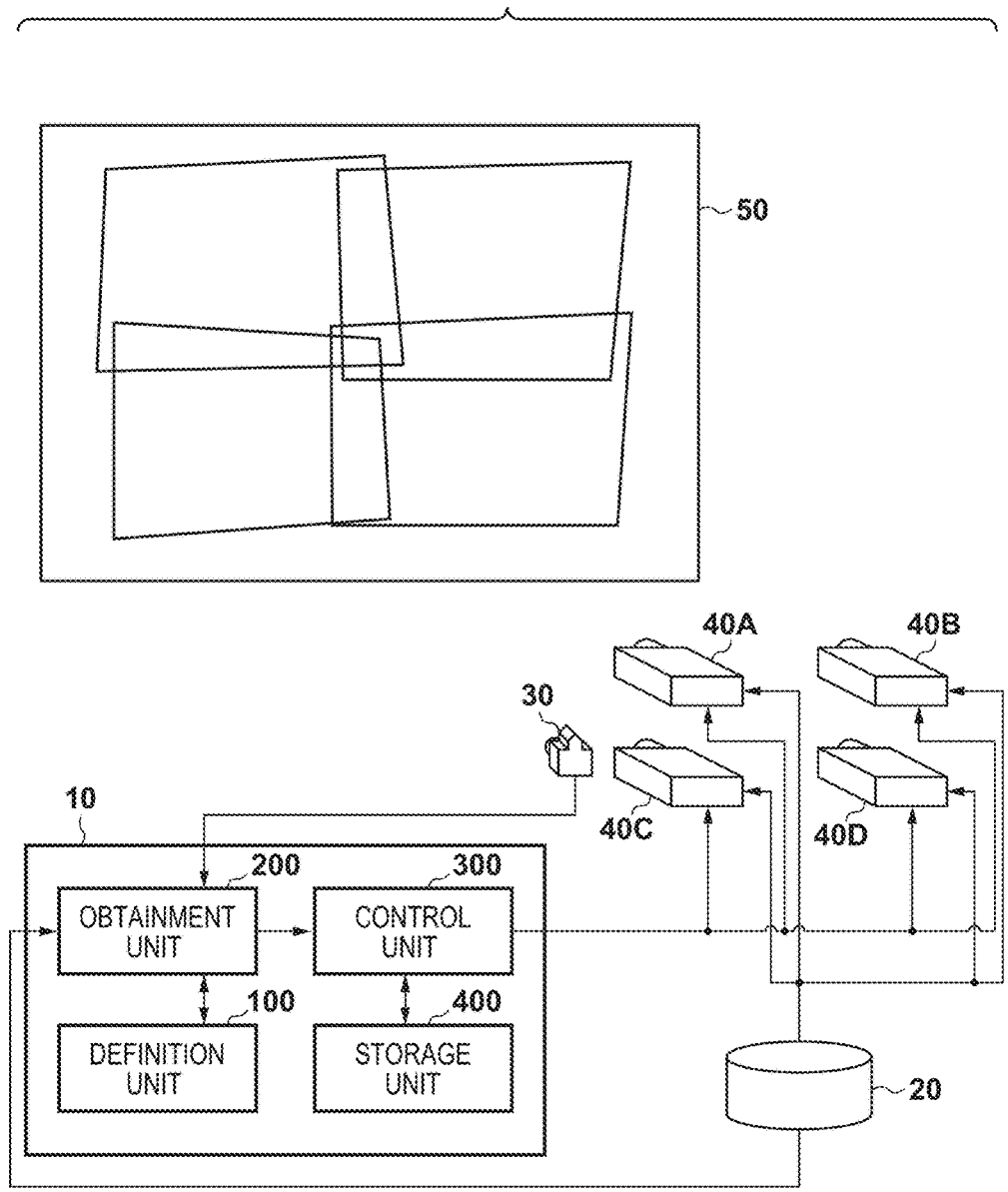
FIG. 1 is an overview configuration diagram of an image display system according to an embodiment of present invention.

FIG. 1 illustrates an example of an overview configuration of an image display system according to an embodiment of present invention. In FIG. 1, 10 denotes a control apparatus, 20 denotes a storage apparatus, 30 denotes an image capturing unit, 40A through 40D denote projection apparatuses, and 50 denotes a screen.

The control apparatus 10 according to the present embodiment controls the plurality of projection apparatuses and performs control for causing projection images to be projected on a projection surface. In response to the controlling of the control apparatus 10, a plurality of the projection images projected from the plurality of projection apparatuses configure a projected image (hereinafter referred to as a multi-screen) in which the plurality of the projection images are combined. In other words, the multi-screen is configured by arranging and projecting the plurality of projection images.

The control apparatus 10 is comprised of a definition unit 100, an obtainment unit 200, and a control unit 300. The definition unit 100 defines an overlap amount (overlap value) of an overlap area upon a multi-screen adjustment based on predetermined overlap area information included by an image stored in the storage apparatus 20. The overlap amount defines a width at which adjacent images overlap each other, for example. The obtainment unit 200 calculates and obtains a correction parameter for the images projected by the respective projection apparatuses for the multi-screen generation based on an image captured by the image capturing unit 30 and the overlap amount of the images defined by the definition unit 100. Also, the obtainment unit 200 performs obtainment of images from the storage apparatus 20. Also, the obtainment unit 200 obtains information indicating the overlap amount. The control unit 300 sets the correction parameter obtained by the obtainment unit 200 to the projection apparatuses 40A to 40D. Also, the control unit 300 controls an operation of each processing unit, an operation of the projection apparatuses 40A to 40D, and an operation of the image capturing unit 30. The control unit 300 can be a processor such as a CPU (Central Processing Unit), for example. In a case where the control unit 300 is configured by a processor, the processor controls an operation of each element of the control apparatus 10 by executing a control program stored in a storage unit 400. The projection apparatuses 40A to 40D perform projection of the images after correcting them based on the correction parameter set by the control unit 300.

The storage apparatus 20 stores images divided in advance for projection in consideration of the predetermined overlap area on the multi-screen for a predetermined image size (aspect ratio). Note that it is assumed in the present embodiment that the control apparatus 10 and the storage apparatus 20 are different components, but they may be comprised in a single body as a personal computer, for example.

The image capturing unit 30 captures the images projected by the projection apparatuses 40A to 40D. The plurality of projection apparatuses 40A to 40D project the images to a screen 50. The image capturing unit 30 captures the images projected on the screen 50 by the plurality of projection apparatuses 40A to 40D, and the captured image obtained by the image capturing unit 30 is fed into the control apparatus 10. In this way, the image capturing unit 30 obtains image information (for example, the captured image) of the images projected sequentially or simultaneously by the plurality of projectors (projection units). In the present embodiment, explanation is given for a case where the control apparatus 10 includes the image capturing unit 30, but the control apparatus 10 may obtain the image information from an external apparatus.

Note, an example for configuring the image capturing unit 30 by an image capturing apparatus which is capable of capturing the entirety of the multi-screen is illustrated in the present embodiment, but the present invention is not limited to this. For example, a plurality of image capturing units capable of capturing projected images of the respective projection apparatuses 40A to 40D and the surrounding of the projected image may be arranged. In this case, the captured images obtained by each image capturing unit are fed into the control apparatus 10.

<2. Processing that Image Display System Executes>

Figure 2:
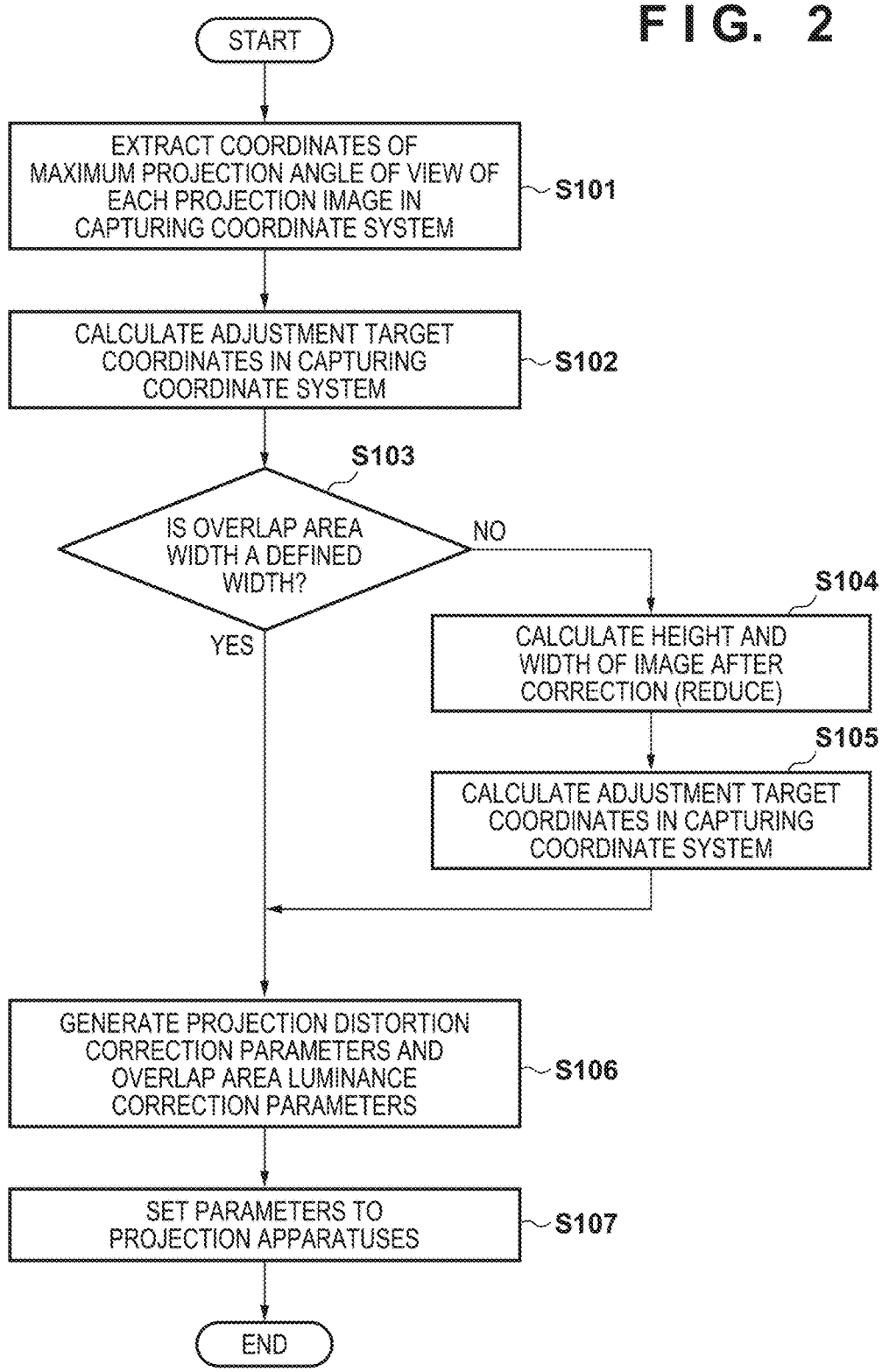
FIG. 2 is a flowchart illustrating a procedure of processing performed by the image display system according to an embodiment of the present invention.

Next, an explanation of a processing procedure performed by an image display system according to an embodiment of the present invention is given with reference to a flowchart in FIG. 2. In a case where the control unit 300 is comprised of a processor such as a CPU, the flowchart illustrated in FIG. 2 illustrates a program read out from the storage unit 400 and executed by the processor.

In step S101, the control apparatus 10 controls a plurality of the projection apparatuses 40A to 40D to project images sequentially. Then, the image capturing unit 30 is controlled to capture the projected images. The control apparatus 10 extracts coordinates of a projection angle of view in a capturing coordinate system from an image captured by the image capturing unit 30. Here, the projection angle of view indicates a projection range at which each projection apparatus is capable of projecting an image. An outer line on each projected image shown in FIG. 1 or FIGS. 3A to 3C illustrates this projection range. For example, a solid image comprised of an entirely uniform tonal value can be used for an image projected in step S101. However, the image is not limited to this and any image may be used if it is able to extract the projected angle of view using the image. Also, if each image projected by the plurality of projection apparatuses 40A to 40D can be distinguished, a configuration may be taken in which the images are not projected sequentially, but are projected simultaneously and the image capturing unit 30 captures the image.

In step S102, the control apparatus 10 calculates and determines adjustment target coordinates in the capturing coordinate system. The adjustment target coordinates are information for indicating a target value for specifying the projection range of the multi-screen. For example, the adjustment target coordinates are determined so that each of the projected images projected from the projection apparatuses 40A to 40D overlaps by the predetermined overlap amount defined by the definition unit 100 in the present embodiment. Furthermore, the adjustment target coordinates may be determined so that the projected images projected from each projection apparatuses 40A to 40D after adjustment have the same size or mutually corresponding sizes. Furthermore, the adjustment target coordinates may be determined so that the size (the angle of view) of the multi-screen projected using the adjustment target coordinates is large.

The definition unit 100 of the present embodiment defines the width of the overlap area by a width corresponding to a resolution of an input image. The input image is an image inputted to the control apparatus 10 as an image that indicates a projected image to be projected, where images projected from a plurality of the projection apparatuses 40A to 40D are combined. For example, in a case where a horizontal resolution of an input image is 1920, the width of the overlap area is defined to be 200. The adjustment target coordinates can be adjusted so that an image aspect ratio after adjustment is equivalent to the aspect ratio of the input image, for example. Also, the adjustment target coordinates are defined so that a rate of the width of the image after adjustment to the width of the overlap area corresponds to a rate of the width of the input image to the width of the predetermined overlap area.

Figure 3A:
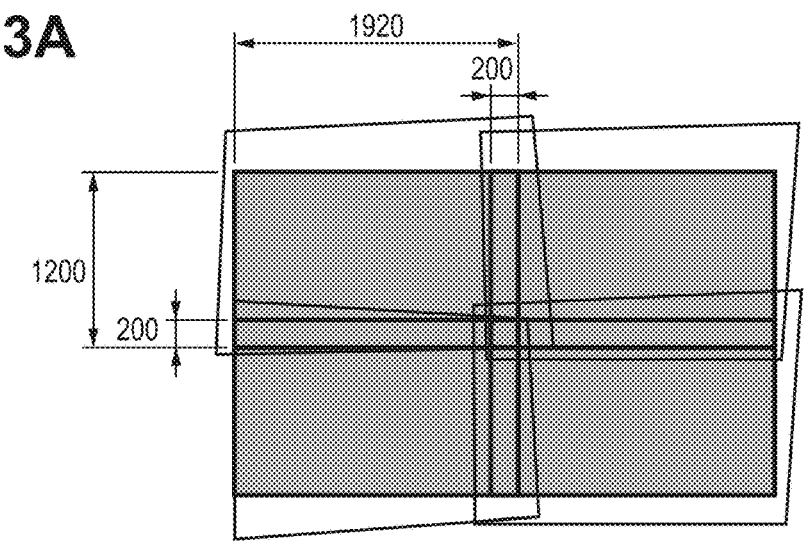
FIGS. 3A to 3C are figures for explaining adjustment target coordinates according to an embodiment of the present invention.
Figure 3B:
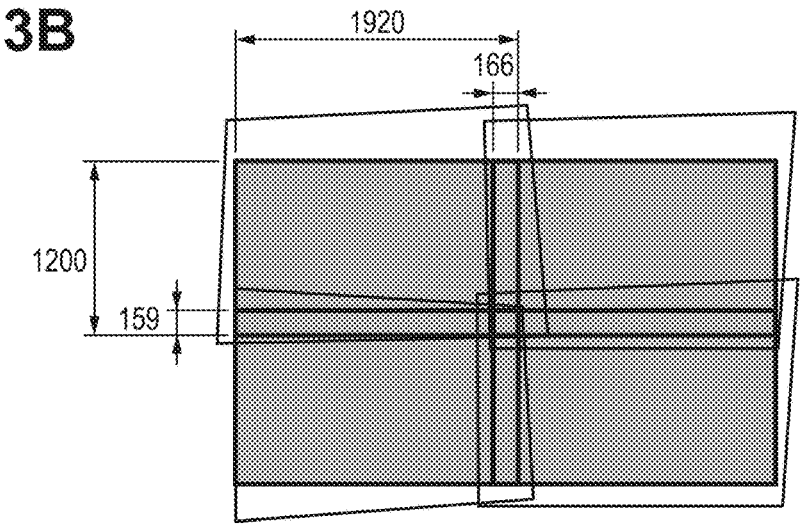

In step S103, the control apparatus 10 determines whether or not the width of the overlap area is the overlap amount defined by the definition unit 100 with the adjustment target coordinates determined in step S102. For example, a case in which the resolution of the input image is 1920×1200 and the overlap area is defined to be 200 horizontally/vertically is considered. In a case where the adjustment target coordinates calculated in step S102 are the defined overlap area width shown in FIG. 3A, it is determined that the adjustment target coordinates are finalized, and the processing proceeds to step S106. On the other hand, in a case where the adjustment target coordinates calculated in step S102 are not the predetermined overlap area width, and the horizontal overlap area width is 166 and the vertical overlap area width is 159 as shown in FIG. 3B, it is determined that the adjustment target coordinates are not finalized, and the processing proceeds to step S104. In other words, in a case where adjacent images cannot overlap each other by the width based on the default overlap amount using the size of the current projected images, the processing proceeds to step S104. It is not possible to change the projection position to exceed the projection range, so adjacent images cannot overlap each other by the width based on the default overlap amount based on the size of the images. The control apparatus 10 determines whether or not adjacent images can overlap each other with the width based on the default overlap amount, based on the projection range of each of the projection apparatuses 40A to 40D.

Also, configuration may be taken such that the control apparatus 10 determines if the width of the overlap area can be made to be the overlap amount defined by the definition unit 100 in a state where images are displayed at their largest initially. In this way, the image can be displayed to be large as possible. Note that the control apparatus 10 determines if the width of the overlap area can be made to be the overlap amount defined by the definition unit 100 in a state where images are displayed at their largest in a keystone corrected state.

In step S104, the control apparatus 10 reduces the size of the multi-screen after adjustment so that the overlap area width becomes the predetermined value. After execution of processing of step S104, the overlap area width becomes the width corresponding to the layout of the projection apparatuses 40A to 40D. For example, the width of the multi-screen in the horizontal direction of the overlap area is made to be 200 and the width in the vertical direction is also made to be 200 after execution of processing of step S104. Also, the width of the multi-screen in the horizontal direction of the overlap area is made to be 166 and the width in the vertical direction is also made to be 159 after execution of processing of step S103. If reduction to 166/200 in the horizontal direction and reduction to 159/200 in the vertical direction is performed, the width in the vertical direction and the horizontal direction of the overlap area can be matched with the predetermined values. However, reduction is performed with the same reduction factor horizontally/vertically in order to maintain the image aspect ratio after adjustment in the present embodiment. In this example, the width of the multi-screen in the vertical direction and the horizontal direction after execution of processing of step S104 are reduced to 159/200.

Figure 3C:
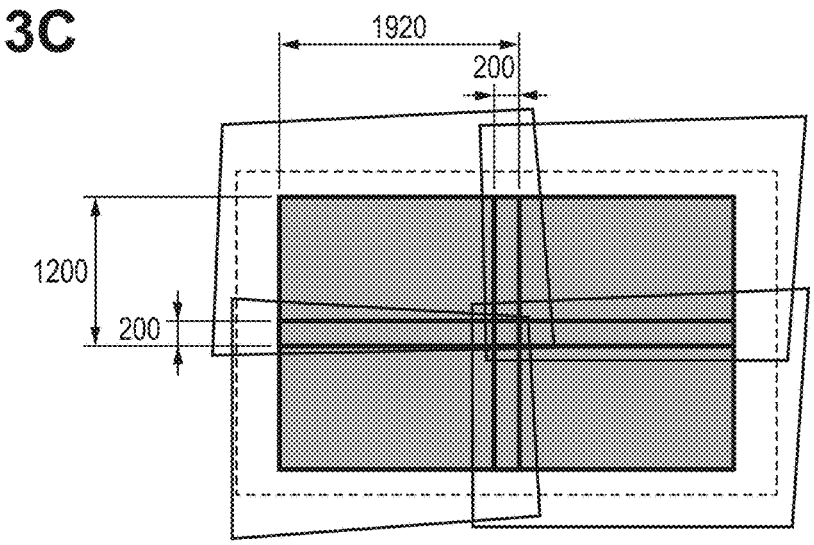

In step S105, the control apparatus 10 once again calculates and determines the adjustment target coordinates. As a result, the adjustment target coordinates shown in FIG. 3C are obtained.

In step S106, the control apparatus 10 obtains a correction parameter based on the determined adjustment target coordinates and the overlap amount defined by the definition unit 100. The correction parameter comprises of a parameter for correcting a shape of each projected image from the plurality of projection apparatuses 40A to 40D, a parameter for correcting the overlap area between the images projected by the plurality of the projection apparatuses 40A to 40D, or the like for example.

In the present embodiment, the control apparatus 10 generates, as a parameter for correcting the shape of each projected image, a projection distortion correction parameter by transforming the adjustment target coordinates in the capturing coordinate system to a display coordinate system of each of the projection apparatuses 40A to 40D. Note, a method of transforming from the adjustment target coordinates to the display coordinate system of the projection apparatuses is not limited in particular, but for example, transforming can be performed by executing an inverse projection transformation using an inverse matrix of a projection transformation matrix upon the image projection.

Also, the control apparatus 10 generates a luminance correction parameter of the overlap area as a parameter for correcting the overlap area. The luminance correction parameter of the overlap area is a correction parameter for setting overlap side information and a defined overlap width of each of the projection apparatuses 40A to 40D.

In step S107, the control unit 300 of the control apparatus 10 sets each correction parameter to each of the projection apparatuses 40A to 40D and the processing is terminated. After that, the plurality of projection apparatuses 40A to 40D project images corrected based on the correction parameters.

As explained above, an image prepared in advance and a projected image can be aligned according to the present invention. Also, a multi-screen is automatically configured to have a predetermined overlap area according to the present invention. Therefore, an adjustment result of the display angle of view and an overlap area of the multi-screen can be fixed while adapting to content prepared in advance.

Also, the definition unit 100 may obtain a parameter used for defining the width of the overlap area from a distribution apparatus through a network. The parameter used for defining the width of the overlap area is a value indicating a rate of a resolution (width) of an input image to the width of the overlap area, for example. Alternatively, the parameter used for defining the width of the overlap area may be the value of the width of the overlap area itself.

Also, configuration may be taken such that the obtainment unit 200 obtains the overlap amount through a network. Also, configuration may be taken such that the distribution apparatus adds and distributes, as meta data, information indicating an overlap amount to the projected image data, and the obtainment unit 200 obtains the overlap amount.

The distribution apparatus is connected through a network to a plurality of the control apparatus 10 arranged at various locations, for example. The distribution apparatus distributes a divided image into which an image to be projected is divided, and distributes a parameter used for defining the width of the overlap area to each control apparatus 10. Each control apparatus 10 generates a multi-screen in a method described above using the divided image and the parameter distributed from the distribution apparatus. In this way, at each location where the plurality of the control apparatus 10 is arranged, multi-screens having a common overlap width can be projected. As a result, it is possible to construct multi-screens easily with a common specification at many locations, for example.

According to the present invention, it becomes possible to reduce a burden corresponding to adjustment for aligning an image that a user intends with a projected image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-246099, filed Dec. 4, 2014, which is hereby incorporated by reference wherein in its entirety.

What is claimed is:

1. A display control apparatus for controlling a multi-projection by a plurality of projection units, the display control apparatus comprising:
an obtaining unit for obtaining an overlap value relating to a width by which a first region image of a whole image and a second region image of the whole image are to be overlapped;
a determining unit for determining whether a width of a projection overlap region in which a first projection image projected by a first projection unit based on the first region image and a second projection image projected by a second projection unit based on the second region image are overlapped is larger than the width according to the overlap value obtained by the obtaining unit; and
a control unit for:
executing, in a case where the determining unit determines that the width of the projection overlap region in which the first projection image projected by the first projection unit and the second projection image projected by the second projection unit are overlapped is larger than the width according to the overlap value obtained by the obtaining unit, first setting processing including distortion correction processing for the first and second projection units such that the width of the projection overlap region in which the first projection image projected by the first projection unit and the second projection image projected by the second projection unit is equal to the width according to the overlap value obtained by the obtaining unit; and
executing, in a case where the determining unit determines that the width of the projection overlap region in which the first projection image projected by the first projection unit and the second projection image projected by the second projection unit are overlapped is not larger than the width according to the overlap value obtained by the obtaining unit, second setting processing including reducing processing for reducing a spatial size of a multi-projection image relative to the case where the first setting processing is executed and distortion processing for the first and second projection units,
wherein an aspect ratio of the whole image is equal to an aspect ratio of a multi-projection image according to the first setting processing and an aspect ratio of a multi-projection image according to the second setting processing.

2. The display control apparatus according to claim 1, wherein the control unit changes, according to a determination result by the determining unit, the first and second region images for causing the first and second projection image to be smaller.

3. The display control apparatus according to claim 1, wherein the overlap value indicates a rate of the width of overlapping in relation to a width of the first region image.

4. The display control apparatus according to claim 1, wherein the control unit causes the first region image and the second region image to overlap by the width according to the overlap value by obtaining a correction parameter based on the overlap value, and causing the plurality of projection units including at least the first and second projection units to project images corrected using the correction parameter.

5. The display control apparatus according to claim 4, wherein the correction parameter includes a parameter for correcting a shape of each projection image projected by the plurality of projection units including at least the first and second projection units.

6. The display control apparatus according to claim 4, wherein the correction parameter includes a parameter for correcting a luminance of an overlap area of each projection image projected by the plurality of projection units including at least the first and second projection units.

7. The display control apparatus according to claim 1, wherein the overlap value is defined based on information set for the projection images projected by respective projection units.

8. The display control apparatus according to claim 1, further comprising a detection unit for detecting a range of an angle of view at which projection images projected by the plurality of projection units including at least the first and second projection units is possible,
wherein the determining unit determines based on the range of the angle of view whether the width of the projection overlap region is larger than the width according to the obtained overlap value.

9. The display control apparatus according to claim 8, wherein the detection unit detects the range of the angle of view by causing each of the plurality of projection units including at least the first and second projection units to project a predetermined image at its largest.

10. The display control apparatus according to claim 8, wherein the detection unit detects the range of the angle of view based on an image in which an image capturing unit captures the projection images projected by the plurality of projection units including the first and second projection units.

11. The display control apparatus according to claim 10, wherein the detection unit detects the range of the angle of view based on an image in which an image capturing unit captures the projection images projected sequentially by the plurality of projection units including the first and second projection units.

12. The display control apparatus according to claim 1, wherein the obtaining unit obtains a plurality of region images each of which is partial image of the whole image, the plurality of region images including the first and second region images, and
wherein the obtaining unit obtains the overlap value relating to an overlap regions of the plurality of region images obtained by the obtaining unit.

13. A method of controlling a display control apparatus for causing a plurality of images to be arranged and projected by a plurality of projection units, the method comprising:

obtaining an overlap value relating to a width by which a first region image of a whole image and a second region image of the whole image are to be overlapped;

determining whether a width of a projection overlap region in which a first projection image projected by a first projection unit based on the first region image and a second projection image projected by a second projection unit based on the second region image are overlapped is larger than the width according to the obtained overlap value;

executing, in a case where the width of the projection overlap region in which the first projection image projected by the first projection unit and the second projection image projected by the second projection unit are overlapped is determined to be larger than the width according to the obtained overlap value, first setting processing including distortion correction processing for the first and second projection units such that the width of the projection overlap region in which the first projection image projected by the first projection unit and the second projection image projected by the second projection unit is equal to the width according to the obtained overlap value; and executing, in a case where the width of the projection overlap region in which the first projection image projected by the first projection unit and the second projection image projected by the second projection unit are overlapped is determined not to be larger than the width according to the obtained overlap value, second setting processing including reducing processing for reducing a spatial size of a multi-projection image relative to the case where the first setting processing is executed and distortion processing for the first and second projection units, wherein an aspect ratio of the whole image is equal to an aspect ratio of a multi-projection image according to the first setting processing and an aspect ratio of a multi-projection image according to the second setting processing.

14. A non-transitory computer-readable storage medium storing a computer program for causing a computer to execute a method of controlling a display control apparatus for causing a plurality of images to be arranged and projected by a plurality of projection units, the method comprising:

obtaining an overlap value relating to a width by which a first region image of a whole image and a second region image of the whole image are to be overlapped;

determining whether a width of a projection overlap region in which a first projection image projected by a first projection unit based on the first region image and a second projection image projected by a second projection unit based on the second region image are overlapped is larger than the width according to the obtained overlap value;

executing, in a case where the width of the projection overlap region in which the first projection image projected by the first projection unit and the second projection image projected by the second projection unit are overlapped is determined to be larger than the width according to the obtained overlap value, first setting processing including distortion correction processing for the first and second projection units such that the width of the projection overlap region in which the first projection image projected by the first projection unit and the second projection image projected by the second projection unit is equal to the width according to the obtained overlap value; and executing, in a case where the width of the projection overlap region in which the first projection image projected by the first projection unit and the second projection image projected by the second projection unit are overlapped is determined not to be larger than the width according to the obtained overlap value, second setting processing including reducing processing for reducing a spatial size of a multi-projection image relative to the case where the first setting processing is executed and distortion processing for the first and second projection units, wherein an aspect ratio of the whole image is equal to an aspect ratio of a multi-projection image according to the first setting processing and an aspect ratio of a multi-projection image according to the second setting processing.

* * * * *